(12) United States Patent
Numao et al.

(10) Patent No.: US 8,618,905 B2
(45) Date of Patent: Dec. 31, 2013

(54) VERIFYING THE OWNERSHIP OF AN OWNER'S AUTHORITY IN TERMS OF PRODUCT AND SERVICE

(75) Inventors: Masayuki Numao, Kawasaki (JP); Yoshinobu Ishigaki, Yokohama (JP); Yuji Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1265 days.

(21) Appl. No.: 12/169,299

(22) Filed: Jul. 8, 2008

(65) Prior Publication Data

US 2008/0272882 A1    Nov. 6, 2008

Related U.S. Application Data

(63) Continuation of application No. 11/319,892, filed on Dec. 28, 2005, now Pat. No. 7,657,740.

(30) Foreign Application Priority Data

Dec. 28, 2004    (JP) .................................. 2004-380867

(51) Int. Cl.
*G05B 19/00* (2006.01)

(52) U.S. Cl.
USPC ............................. 340/5.1; 340/5.8; 340/10.1

(58) Field of Classification Search
None
See application file for complete search history.

(56) References Cited

U.S. PATENT DOCUMENTS

| | | | |
|---|---|---|---|
| 5,805,911 A | 9/1998 | Miller | |
| 5,942,978 A | 8/1999 | Shafer | |
| 6,697,948 B1 * | 2/2004 | Rabin et al. ..................... 726/30 |
| 6,748,533 B1 | 6/2004 | Wu et al. | |
| 7,051,206 B1 | 5/2006 | Giest et al. | |
| 7,174,153 B2 | 2/2007 | Ehlers | |
| 7,176,791 B2 | 2/2007 | Sakaki et al. | |
| 7,209,889 B1 * | 4/2007 | Whitfield ................... 705/14.39 |
| 7,212,637 B2 | 5/2007 | Salisbury | |
| 7,284,003 B2 | 10/2007 | Honda | |

(Continued)

FOREIGN PATENT DOCUMENTS

| | | |
|---|---|---|
| JP | 11296076 | 10/1999 |
| JP | 2001160117 | 6/2001 |

(Continued)

OTHER PUBLICATIONS

Ari Juels and John Brainard, Soft Blocking: Flexible Blocker Tags on the Cheap, 1999, RSA Laboratories, pp. 1-15.*

(Continued)

*Primary Examiner* — Mohammad Ghayour
*Assistant Examiner* — Brian Wilson
(74) *Attorney, Agent, or Firm* — Shimokaji & Assoc., PC

(57) ABSTRACT

The present invention provides an apparatus for verifying the authority of an owner, in terms of an identifier of a product, the first verification information for verifying the authority held at a terminal for an owner with the authority involving the product, and the second verification information for verifying the authority concerning the identifier of the product stored in a product database. The apparatus comprises means for receiving the identifier and the first verification information, means for acquiring the second verification information from the product DB, and means for determining whether or not there is the authority from the first verification information and the second verification information. A hash value acquired from a one-way hash function is employed as a verification key of the verification information.

18 Claims, 7 Drawing Sheets

(56) References Cited

U.S. PATENT DOCUMENTS

| | | |
|---|---|---|
| 7,333,001 B2 | 2/2008 | Lane et al. |
| 7,376,626 B2 | 5/2008 | Nagai et al. |
| 7,503,480 B2 | 3/2009 | Barnes et al. |
| 2001/0056409 A1* | 12/2001 | Bellovin et al. ............... 705/64 |
| 2002/0111837 A1* | 8/2002 | Aupperle ........................ 705/5 |
| 2002/0165912 A1 | 11/2002 | Wenocur et al. |
| 2002/0169714 A1 | 11/2002 | Ike et al. |
| 2002/0178360 A1 | 11/2002 | Wenocur et al. |
| 2002/0194483 A1 | 12/2002 | Wenocur et al. |
| 2002/0194501 A1 | 12/2002 | Wenocur et al. |
| 2002/0196935 A1 | 12/2002 | Wenocur et al. |
| 2002/0199001 A1 | 12/2002 | Wenocur et al. |
| 2002/0199096 A1 | 12/2002 | Wenocur et al. |
| 2003/0009694 A1 | 1/2003 | Wenocur et al. |
| 2003/0041110 A1 | 2/2003 | Wenocur et al. |
| 2003/0050891 A1* | 3/2003 | Cohen ........................... 705/42 |
| 2004/0039919 A1* | 2/2004 | Takayama et al. ............ 713/180 |
| 2004/0088176 A1 | 5/2004 | Rajamani |
| 2004/0181681 A1 | 9/2004 | Salisbury |
| 2004/0196981 A1* | 10/2004 | Nakano et al. ................ 380/280 |
| 2004/0249764 A1* | 12/2004 | Delitz et al. ................... 705/60 |
| 2005/0033619 A1 | 2/2005 | Barnes et al. |
| 2005/0038718 A1 | 2/2005 | Barnes et al. |
| 2005/0049979 A1* | 3/2005 | Collins et al. ................. 705/75 |
| 2005/0061875 A1 | 3/2005 | Zai et al. |
| 2005/0105140 A1 | 5/2005 | Ozaki |
| 2005/0144475 A1 | 6/2005 | Sakaki et al. |
| 2005/0164673 A1 | 7/2005 | Ehlers |
| 2005/0198489 A1 | 9/2005 | Wallace et al. |
| 2005/0218209 A1 | 10/2005 | Heilper et al. |
| 2006/0033608 A1 | 2/2006 | Juels et al. |
| 2006/0034453 A1 | 2/2006 | Liu |
| 2006/0071791 A1 | 4/2006 | Meyers et al. |
| 2006/0143452 A1* | 6/2006 | Numao et al. ................ 713/168 |
| 2006/0247984 A1 | 11/2006 | Shaw |
| 2006/0251442 A1 | 11/2006 | Fuqua et al. |
| 2007/0106892 A1* | 5/2007 | Engberg ........................ 713/168 |
| 2007/0150963 A1* | 6/2007 | Lee et al. ...................... 726/27 |
| 2007/0214094 A1* | 9/2007 | Yokota et al. ................. 705/77 |
| 2008/0214312 A1* | 9/2008 | Richard ......................... 463/47 |

FOREIGN PATENT DOCUMENTS

| | | |
|---|---|---|
| JP | 2001184312 | 7/2001 |
| JP | 2003099662 | 4/2003 |
| JP | 2003524242 | 8/2003 |
| JP | 2003308249 | 10/2003 |
| JP | 2004135058 | 4/2004 |

OTHER PUBLICATIONS

Yuji Watanabe et al., "Personalized Privacy Information Management", Collected papers of Computer Security Symposium 2004, vol. 1 of 2, Japan, Information Processing Society of Japan, Oct. 20, 2004, Vo. 2004, No. 11, p. 145-150, Symposium Series Information Processing Society of Japan.

Masayuki Numao et al., "On Security in Supply Chain Traceability", Symposium on Cryptography and Information Security, Hiroshima, Japan, Jan. 17-20, 2006.

Shingo Kinoshita et al., "Low-cost RFID Privacy Protection Scheme", Journal of Information Processing Society of Japan, Japan, Information Processing Society of Japan, Aug. 15, 2004, vol. 45, No. 8, p. 2007-2021.

Masayuki Numao et al., "Owner Authentication Method for RFID Traceability with Ownership Transfer", CD-ROM of Collection of Abstracts for 2005 Code Language and Information Security Symposium SCIS 2005, 2006 Code Language and Information Security Symposium Execution Committee Executive Office, Jan. 17, 2006.

Ari Juels et al., "Soft Blocking: Flexible Blocker Tags on the Cheap", URL: http://www.rsa.com/rsalabs/staff/bios/ajuels/publications/softblocker/softblocker.pdf, 1999.

Office Action from U.S. Appl. No. 11/319,892 dated Mar. 31, 2009.

* cited by examiner

VERIFYING THE OWNERSHIP OF AN OWNER'S AUTHORITY IN TERMS OF PRODUCT AND SERVICE

CLAIM FOR DOMESTIC PRIORITY

This application is a continuation of application Ser. No. 11/319,892, U.S. Pat. No. 7,657,740, filed Dec. 28, 2005.

FIELD OF THE INVENTION

The present invention relates to an apparatus, a method and a program for verifying the authority of a person as to whether or not the person is entitled to gain access to the information regarding a manufacturing process or circulation of a product or a service in the case of managing the product or service with RFID (Radio Frequency Identification), an IC tag, a two-dimensional bar code or any other identifier.

BACKGROUND ART

In the distributing industry, means of managing products (goods) are shifting from barcodes or the like to RFID (Radio Frequency Identification) using wireless chips or the like. The RFID is drawing attention as the important technique not only in promoting efficiency of stock and distribution of products but also in promoting the information technology and the automation technology, as wireless chips are added to various products in using the RFID. The RFID may be used for enabling a purchaser to search information on a food product he bought such as its producing region, its producer or its processor based on RFID data, or for a user to automatically list up foods stored in his refrigerator and notice him of expiration date of the foods. In order to put the RFID into widespread use, the RFID must be inexpensively supplied and used.

In order to inexpensively supply and use the RFID, the most feasible option of the RFID is that the RFID made to save only product identifying information such as ID information, with information on product such as the producer and tracking information of the distribution channel being recorded in a product database (DB) server or the like and referenced by the product ID information. Practically, product ID information is read through a tag reader, sent to the product DB server to enable information on the product information to be accessed. In such a case, an authorized owner of an authority must be assured to access the information and an abuser must be prevented from acquiring product information, from distributing fake products, or from interfering a traceability system with fake goods or the like.

The following documents are considered:
[Patent Document 1] National Publication of International Patent Application No. 2003-524242
[Patent Document 2] Published Unexamined Patent Application No. 2001-184312
[Patent Document 3] Published Unexamined Patent Application No. 2001-160177
[Patent Document 4] Published Unexamined Patent Application No. 2001-160177
[Non-patent Document 1] A. Juels and J. Brainard, "Soft Blocking: Flexible Blocker Tags on the Cheap," URL: http://www.rsasecurity.com/rsalabs/staff/bios/ajuels/publica tions/softblocker/softblocker.pdf.

Patent Document 1 describes a method for providing a tag chip with two storage areas of a tag address and a security block and verifying a tag address usually read as RFID by comparing the tag with the second security block. A tag reader first reads a tag address, encrypts the tag address with a secret key it holds, and verifies the tag address by comparing the encrypted result and a value in the security block. Patent Document 2 discloses a method for saving verifying information in the tag and making a reader verify the owner with the authority by using the verifying information. This method saves information on a face image, a signature or a password in a tag for locally verifying the owner. Patent Document 2 shows a system for providing RFID to both a user and a confidential document and allowing a user to copy or the like the document only if the security level of the RFID owned by the user is higher than that of the RFID tag added to the confidential document. Patent Document 4 shows that a wireless tag stores goods identifiers and goods secret keys, creates goods digital signature by using the goods secret key or the like, and sends the goods digital signature to a verifying computer for verification. Non Patent Document 1 shows a method for controlling the reading of RFID added to a product with another RFID tag called Blocker tag by using a multi-accessing function of a reader.

PROBLEMS TO BE SOLVED BY THE INVENTION

The abovementioned techniques, however, cannot sufficiently prevent an abuser from accessing a product DB by using an unauthorized copy of an RFID tag. Even if the techniques can prevent an RFID tag from being illegally copied, they cost high. The technique described in Patent Document 1 is ineffective against an attack that uses a duplicated tag made by copying both a tag address and a security block. As the technique always uses the same tag address and the same security block, it is vulnerable to replay attacks. The technique described in Patent Document 2 is appropriate for a bank card or the like, where an owner of a tag is permanent, but is not appropriate for a product tag used in the distribution industry, where an owner of a tag is not permanent, as the technique saves verifying information in a tag. As the technique needs quite large storage for tags and quite many reader functions, the RFID cannot be used inexpensively. This kind of problem indicated for Patent Document 1 and Patent Document 2 can also be indicated for Patent Document 4. Although the technique described in Patent Document 3 provides RFID to both a user and a confidential document, it lacks a system for transferring ownership of a product which moves as it distributed or security measures against replay attacks. For example, the technique has a problem in enabling an abuser to behave as an authorized user if only the abuser reads an RFID tag for a user by another tag reader and copies it. The technique described in Non-Patent Document 1 only controls reading of tag information by a tag reader by using Blocker tag and cannot be applied to the case that a product moves as it distributed.

SUMMARY OF THE INVENTION

In order to solve the above problems, the present invention provides apparatus for verifying the authority of a person/owner in terms of an identifier of a product, first verifying information for verifying the authority held at a terminal for an owner with the authority involving said product, and second verifying information for verifying the authority concerning the identifier of said product stored in a product DB (database).

An apparatus comprises means for receiving said identifier and said first verifying information, means for acquiring said second verifying information from said product DB, and means for determining whether or not there is the authority from said first verifying information and said second verifying information. If fake products made by copying the RFID appear, the apparatus according to the present invention can inexpensively prevent an abuser from accessing the verifying information and a false product from interfering a traceability system with fake goods, as the technique verifies the RFID, which is an identifier of each of the separately managed products and information for verifying an owner with the authority at a product/service DB server.

BRIEF DESCRIPTION OF THE DRAWINGS

For a more complete understanding of the present invention and the advantage thereof, reference is now made to the following description taken in conjunction with the accompanying drawings, in which.

DETAILED DESCRIPTION OF THE INVENTION

The present invention provides methods, systems and apparatus for verifying the authority in terms of an identifier of a product, by first verifying information for verifying the authority held at a terminal for an owner with the authority involving said product, and second verifying information for verifying the authority concerning the identifier of said product stored in a product DB (database)

An embodiment of an apparatus comprises means for receiving said identifier and said first verifying information, means for acquiring said second verifying information from said product DB, and means for determining whether or not there is the authority from said first verifying information and said second verifying information. If fake products made by copying the RFID appear, the apparatus according to the present invention can inexpensively prevent an abuser from accessing the verifying information and a false product from interfering a traceability system with fake goods, as the technique verifies the RFID, which is an identifier of each of the separately managed products and information for verifying an owner with the authority at a product/service DB server.

The present invention can assure an advanced security against leakage of a verification key by using a so-called one-time verification key, as said means for determining performs determination by using a hash value acquired by applying a one-way hash function to a value acquired by a predetermined method by t (an integer of 1 or more) times as a verification key for verifying information, and performs determination by using a hash value acquired by applying said one-way hash function by t−1 times to said number as a verification key for verifying information for the next verification. The present invention further improves security by using said hash value acquired by applying the hash function to the number by t−1 times as an encryption key when verifying information for verifying said authority is received from the terminal of an owner with the authority.

The outlined present invention above does not enumerate all the features necessary to implement the present invention, and sub-combinations of the features can be included in the present invention. Although the present invention will be described through its embodiments, the embodiments below do not limit the present invention included according to the claims below. Features described in the embodiments are combined just for helping a reader in understanding the present invention and it is not necessary to implement all of them as solving means of the present invention.

Figure 1:
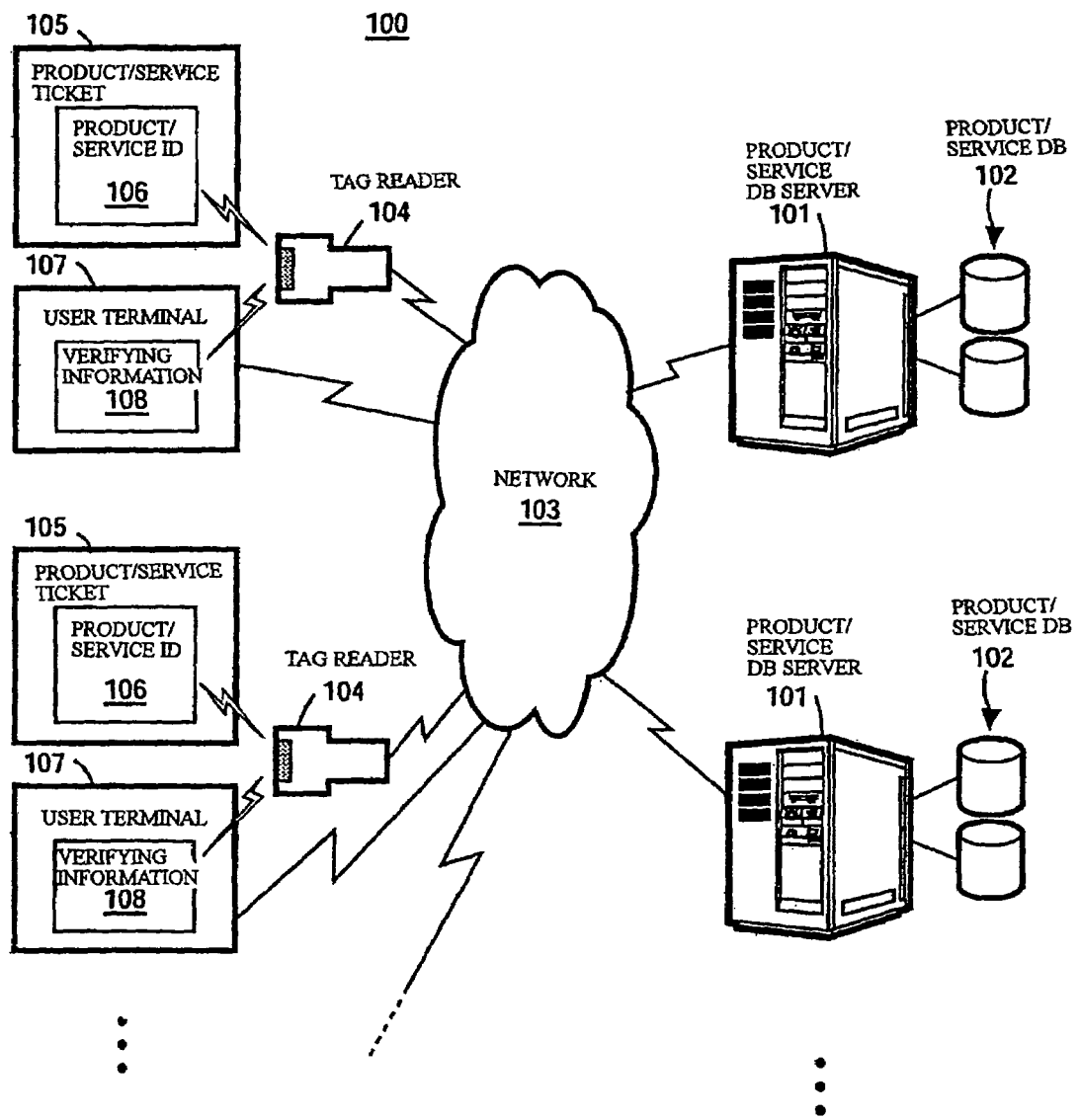
FIG. 1 shows an outline of a system for verifying an authority in terms of a product/service operates.

FIG. 1 shows an outline of an environment where a system for verifying an authority in terms of a product/service operates. A product/service database (DB) server 101 responds to a request for sending information on a product/service. The product/service DB server verifies an authority of who requests information on the product/service. The product/service DB server also transfers an authority in terms of a product/service. A product/service DB 102 saves information on a product or a service and also saves information for verifying authority. The DB 102 may register only information on a product, or information on a service, or information on both a product and a service. A plurality of the product/service DB servers 101 exist, as they are managed by a producer or a distributor. One who owns the authority in terms of a product/service may need to view a past distribution channel of a product or a history of a service. Therefore, as the product/service is distributed through a market, information on the same product/service may present in a plurality of product/service DBs 102. The product/service DB saves information on a product, or information on a service, or information on the both. A network 103 connects the product/service DB server 101, a tag reader 104 or a user terminal 107 through a communication line. The network 103 is not limited to any particular network and can be either a wired network or a wireless network if only it is used for communication.

The tag reader 104 is an appliance for reading a product/service ID 106 or verifying information 108 and sending it to the product/service DB server 101. The tag reader 104 may directly send/receive data to/from the product/service DB server 101 with a communication function. Alternatively, the tag reader 104 may have only a function of simply reading data and be connected with a communication appliance such as a personal computer. In this example, the tag reader 104 is shown as having a communication function. The tag reader 104 is preferably a multi-tag reader, which can read both a tag added to a product/service and a tag added to a user terminal. The tag reader 104 can easily accommodate the multi-tag reader by distinguishing the read in ID among a product/service ID, an owner ID (verification key), or a new owner ID for an assignee (verification key) shown in FIG. 6 to be described later, by identifying them with a header part (for example, product/service ID: 00, owner ID: 01, new owner ID: 11) of a RFID code or the like. The reference numeral 105 denotes a product/service ticket. This ticket can be a ticket for a product to be distributed in a market a member's card or a coupon for receiving a service, for example.

The product/service ticket 105 is added with a product/service ID 106 and functions as an identifier for identifying the product or the service. The product/service ID 106 is not limited to particular IDs and can be any ID if only it can identify a product/service, such as a wireless ID tag, RFID, a one-dimensional barcode or two dimensional barcode. The product/service ID 106 can be directly added to a product but not to a service. Therefore, the product/service ID 106 is attached to a service ticket including a coupon or a ticket for receiving a service. The service ticket is not limited to a ticket printed on a sheet of paper and may be a ticket made of electronic codes. The reference numeral 107 denotes a user terminal and includes verifying information for verifying the ownership of the authority. The verifying information is verifying information 108, which relates to a verification key for verifying the authority. The verifying information 108 is used in verifying the ownership of the authority in terms of a product or a service at a product/service DB. The user terminal 107 can be a PDA (Persona Digital Assistance) or a cellular phone, or a terminal device such as a notebook personal computer or a desktop personal computer. The user terminal 108 preferably comprises a communication function when it needs to acquire information from a product/service DB server. The user terminal 107 may be integrated with a function of the tag reader 104.

Figure 2:
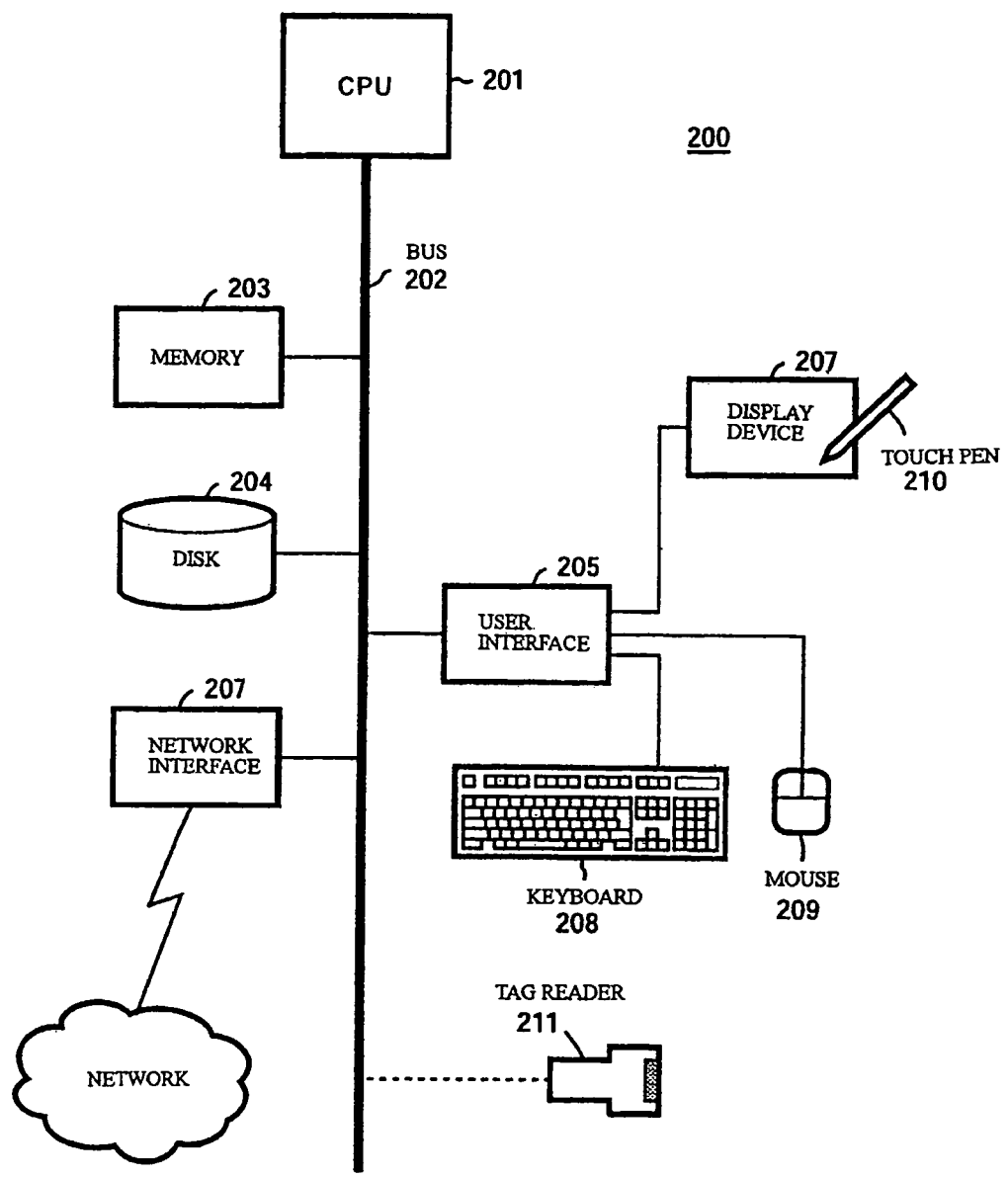
FIG. 2 shows an example of a hardware configuration of the product/service DB server or a user terminal.

FIG. 2 outlines a hardware configuration 200 of the product/service DB server 101 or a user terminal. A CPU 201, which is a central processing unit, performs various programs under the control of various OSs. The CPU 201 interconnected with memory 203, a disk 204, a user interface 205 and a network interface 206 via a bus 202. The CPU 201 is connected with a display device 207, a keyboard 208 and a mouse 209 via the user interface 205 and connected with a network via the network interface 206. A user can input information through a touch pen 210 other than the keyboard 208 and the mouse 209. Therefore, the CPU 201 needs not to comprise all but any one of those denoted by the reference numerals 208-210. The memory 203 comprises main memory or cache memory. The cache memory is used for storing data of a product/service or owner information searched from a product/service DB saved in the disk 204 or the like.

The disk 204 stores a program for verifying the authority in terms of a product/service at a product/service DB server. The program is read by the CPU 201 into main memory and executed. The disk 204 saves a product/service DB. The product/service DB needs not be saved on the same disk as that saves the program for verifying the authority in terms of a product/service. Therefore, a plurality of disks 204 may be present here. When a hardware configuration 200 is a user terminal, the disk 204 records a program operating at a user terminal and also saves verifying information. When a user terminal is integrated with a tag reader, a tag reader 211 is connected with the bus 202.

When a user terminal is a PDA, generally without the keyboard 208 and 8 the mouse 209, a user inputs information by using the touch pen 210. When a user terminal is a cellular phone, push buttons on the cellular phone substitute for the keyboard 208. When a product/service DB server and a user terminal directly communicate data with each other, they use the network interface 206. The hardware configuration 200 disclosed here is merely an example of a computer system and a bus arrangement. The features of the present invention can be implemented in various system configurations with a plurality of the same components included in a system or distributed over a network.

Figure 3:
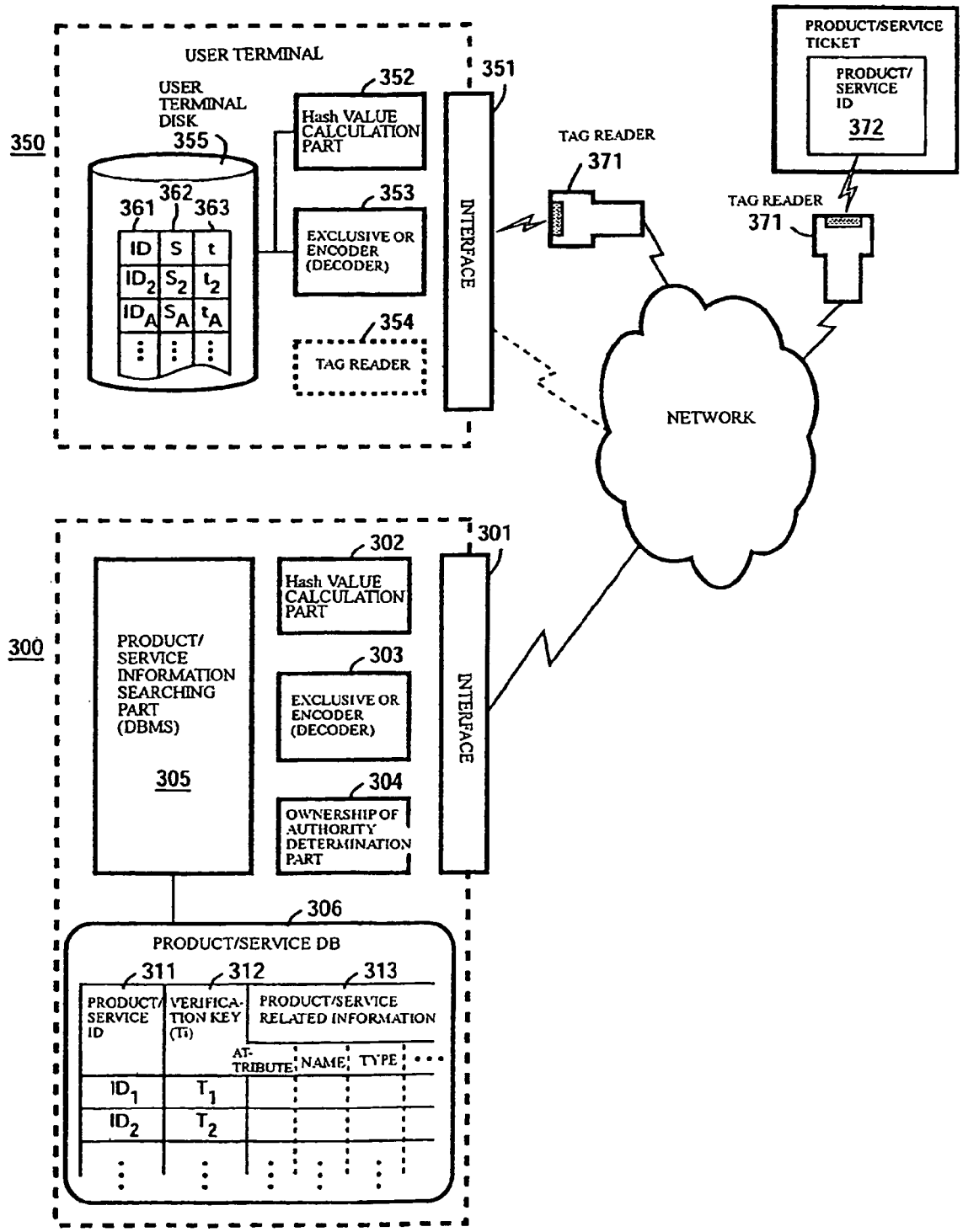
FIG. 3 shows an example of a function block diagram of functions of a product/service DB server and a user terminal.

FIG. 3 schematically shows a function of a product/service DB server 300 and a user terminal 350. First, the product/service DB 300 will be described. The reference numeral 301 denotes an interface for sending/receiving data to/from a user terminal or a tag reader. Blocks are schematically shown. The reference numeral 302 denotes a hash value calculation part for calculating a hash value by using a hash function. A hash function used at the hash value calculation part 302 is preferably a one-way hash function. The reference numeral 303 denotes an exclusive OR encoder for calculating an exclusive OR. The exclusive OR encoder 303 also decodes data of a verification key or the like, which is encrypted by an exclusive OR and received from a tag reader or a user terminal, by using a secret key or the like.

The reference numeral 304 denotes an authority verification part for verifying the authority possession in terms of a product/service. The ownership of the authority determination part 304 determines the presence or absence of the ownership of the authority by using a verification key saved at a user terminal (a first verifying information) and a verification key received from a product/service information searching part 305 (a second verifying information). The product/service information searching part 305 is a DBMS (DataBase management System) for accessing a product/service DB 306. The product/service DB 306 comprises a product/service ID 311, an authority verification key 312, an attribute of a product/service and product/service related information 313 such as a name.

Now, functions of the user terminal 350 will be described. An interface 351 is an interface for communicating data with a product/service DB server. When a user terminal is attached with a tag reader, the interface 351 is used for sending an ID or the like read from the tag to a product/service DB and receiving information in terms of a product/service sent from the product/service DB server. The reference numeral 352 denotes a hash value calculation part for calculating a hash value by using a hash function. The hash function to be used at the hash value calculation part 352 is preferably a one-way hash function as that is used at the product/service DB. The reference numeral 353 denotes an exclusive OR encoder for calculating an exclusive OR. The exclusive OR encoder 353 also decodes data of product/service related information or the like encrypted by an exclusive OR that is received from the product/service DB.

The reference numeral 354 denotes a tag reader. The tag reader 354 is not necessary for a user terminal and can be implemented by reading a product/service ID and an authority verification key from a tag reader placed near. The reference numeral 355 denotes a disk (storage device) at a user terminal. The disk 355 saves a product/service ID 361 for verifying the ownership of the authority, a number S (made by random numbers or the like) 362 to be applied with a one-way hash value and the number t to apply a hash function 363. In order to make a single user terminal adapted to accommodate a plurality of products/services, those denoted by the reference numerals 361 to 362 are recorded for each product/service. When there are a plurality of product/service IDs, the tag reader 371 can easily identify an verification key for each product/service if only MAC of a product/service ID (may be a short hash or a checksum) is used as a part of a verification key. As such, the user terminal 350 manages verifying information by creating a verification key for each product/service with information on the disk 355. Generally, the multi tag reader 371 reads a product/service ID 372 attached to a product/service ticket and verifying information to be managed at the user terminal 350. Although respective functions are represented and arranged in FIG. 3 by block, the functions are not limited to be arranged in this block configuration and can be implemented by other functional block embodiment if only the configuration has these functions, as the respective functions can be made in blocks with various ranges.

Figure 4:
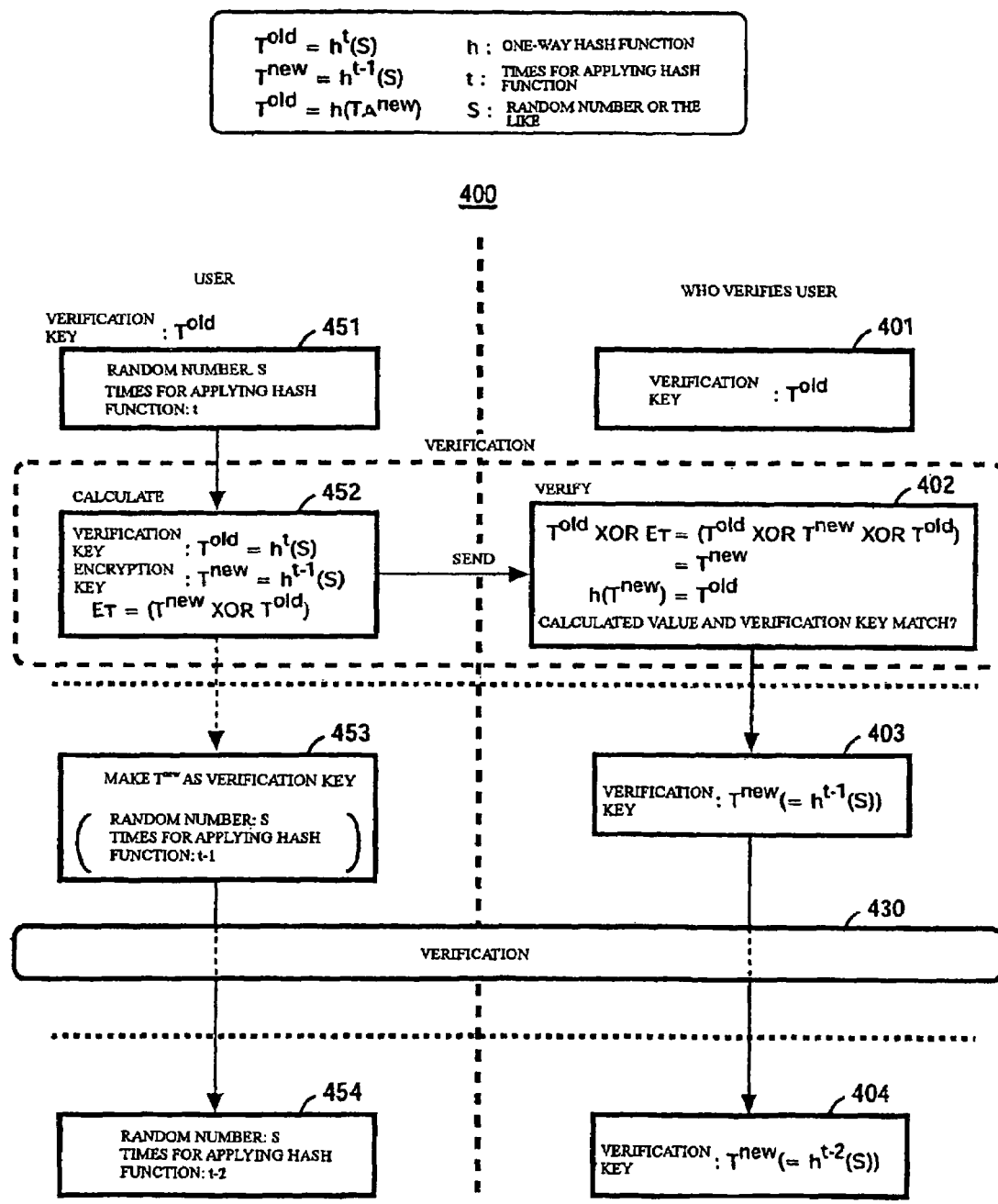
FIG. 4 illustrates the basic concept of the authority verification in terms of a product/service.

FIG. 4 illustrates the basic concept of the authority verification in terms of a product/service. The authority verification uses so called S/Key verification method, which uses a one-time verification key with a one-way hash function. In this authority verification, the verification key is encrypted with an exclusive OR for security before the key is transmitted. A one-way hash function is a hash function, which cannot give a value (a certain value) before applied with the hash function from the hash value acquired by applying the hash function to a certain value. The verification method is outlined in FIG. 4. Where t is an integer of 1 or more, $T^{old}$ is what a one-way hash function h is applied to a random number S by t times, i.e., $T^{old}=h^t(S)$. Here, the random number is S, though, the random number can be the number acquired by a predetermined method including a predetermined number.

As h is a one-way hash function, it cannot give the number before being applied with the hash function from the hash value. $T^{new}=h^{t-1}(S)$, which means that $T^{new}$ is what the hash function h is applied with t−1 times. And $T^{old}=h(T^{new})$, which means that $T^{old}$ is what the hash function h is applied to $T^{new}$ once. This means that $T^{old}$ can be acquired from $T^{new}$ but $T^{new}$ cannot be acquired from $T^{old}$. A user and who verifies the user use $T^{old}$ as the verification key (block 401, 451). Actually, the user holds the random number S and the times t that a hash function was applied to S. At block 452, the user calculates the verification key, the encryption key and the exclusive OR of them and sends the results to who verifies the user. The verification key $T^{old}$ is acquired from the random number S by using a value $h^t(S)$, which is what the hash function h is applied to S by t times. In order to encrypt the verification key $T^{old}$, the user calculates $T^{new}=h^{t-1}(S)$ and an exclusive OR of $T^{old}$ and $T^{new}$, $E_T=(T^{new}$ xor $T^{old})$, and sends the result to who verifies the user.

Who verifies the user performs verification at block 402. Who verifies the user calculates an exclusive OR, $E_T$ xor $T^{old}=T^{new}$ xor $T^{old}$ xor $T^{old}=T^{new}$ by using its holding verification key $T^{old}$. Then who verifies the user calculates $T^{old}$ from h ($T^{new}$), which is what the hash function is applied to $T^{new}$ once. If the result matches with $T^{old}$, which is held by the server, who verifies the user certifies the user. Then the server and the user use $T^{new}$ as a verification key (block 403, 453). Actually, the user holds the times t that the hash function is applied to the random number S. When the next verification (block 430) ends, the new verification key is T $(=h^{t-2}(S))$ (block 404, 454). The verification key comes next is T $(=h^{t-3}(S))$. The authority is verified with new verification key for each time. As the new verification key cannot be calculated from the old verification key, the security is kept high even if an old verification key is leaked.

Figure 5:
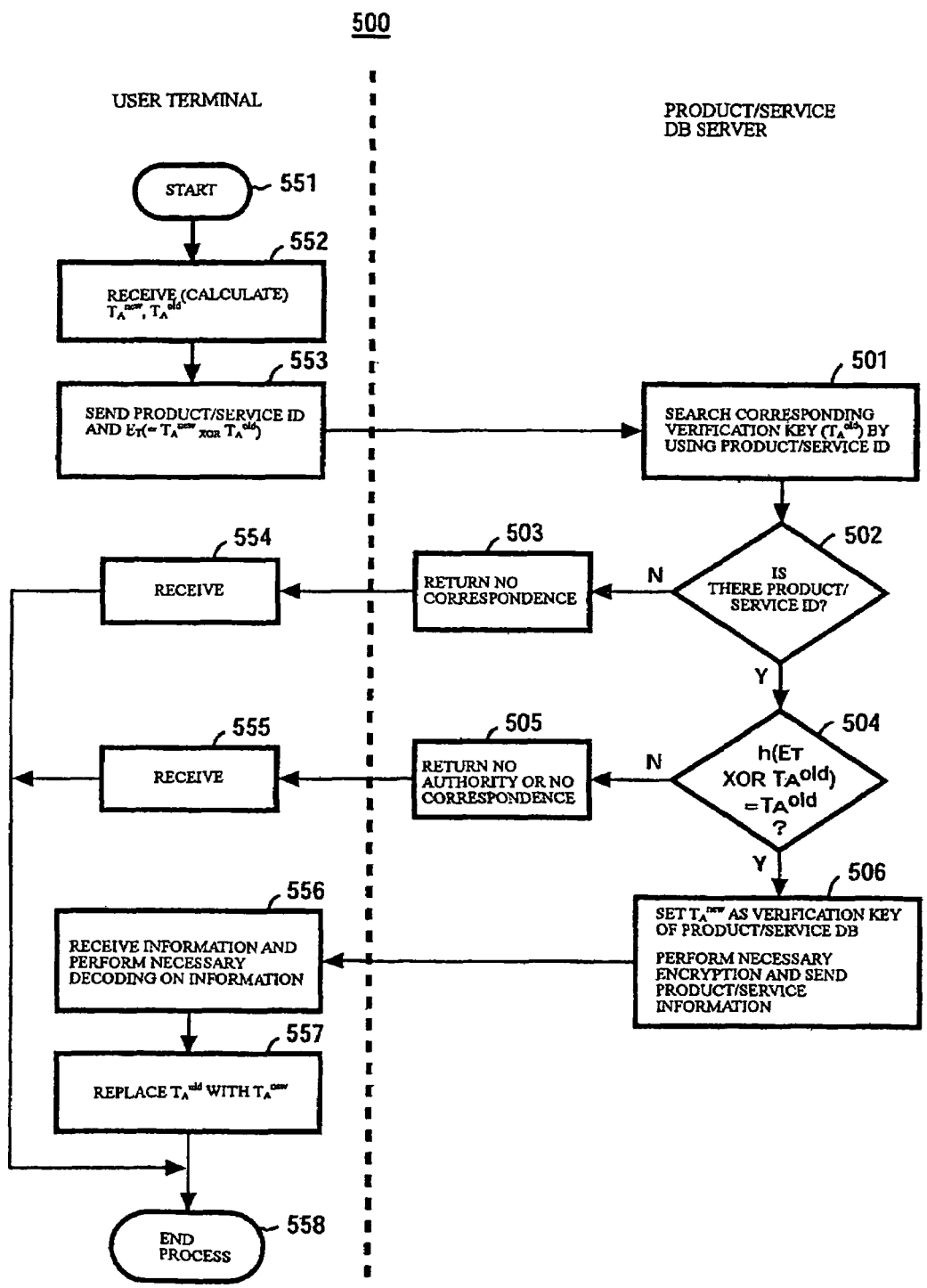
FIG. 5 shows an example of a flow of verifying the ownership of the authority in terms of a product/service performed at a product/service DB server and a user terminal.

FIG. 5 shows a flow 500 of verifying the ownership of the authority in terms of a product/service performed at a product/service DB server and a user terminal. Processes performed by a user terminal are shown in the left side and that by a product/service DB server is shown in the right side. At step 551, the processing starts. At step 552, $T_A^{new}$ and $T_A^{old}$ are acquired. A hash value calculation part 352 of the user terminal shown in FIG. 3 calculates $T_A^{new}$ and $T_A^{old}$ by using a hash function h, t (an integer of 1 or more) and a random number $S_A$. $T_A^{old}$ is a value that the hash function is applied to $S_A$ by t times. $T_A^{new}$ is a value that the hash function is applied to $S_A$ by (t−1) times. At step 553, the user terminal calculates an exclusive OR $E_T$ of $T_A^{new}$ and $T_A^{old}$ and sends the result with the product/service ID to the product/service DB server. Usually, a multi-tag reader is responsible for sending them. The calculation of the exclusive OR $E_T$ is encryption of $T_A^{old}$). If a tag reader is separated from the user terminal, the sending process at step 553 is performed by the tag reader.

Then the process is performed by the process/service DB server. At step 501, the process/service DB server searches a product/service DB for a corresponding verification key $(T_A^{old})$ by using the product/service ID as a searching key. At step 502, the process/service DB determines whether there is a corresponding product/service ID or not. If it is determined that there is no corresponding product/service ID (No), the product/service DB server sends a message that there is no corresponding product/service ID to the user terminal at step 503. At step 554, the user terminal receives the message that there is no corresponding product/service ID and proceeds to step 558 and ends the process. If it is determined that there is a corresponding product/service ID (Yes) at step 502, i.e., that the authority is certified, the product/service DB server responds to the determination and proceeds to step 504. At step 504, the product/service DB server calculates $T_A^{new}$ from the exclusive OR of the searched verification key $(T_A^{old})$ and $E_T$, and determines whether the value that the calculated result is applied with the hash function matches the searched verification key $(T_A^{old})$ or not. If it is determined that they do not match (No), the product/service DB server proceeds to step 505 and sends a message that the user has no authority to the user terminal.

At step 555, the user terminal receives the message that the user has no authority, and proceeds to step 558 and ends the process. If it is determined that they match (Yes) at 504, the product/service DB proceeds to step 506 and sets $T_A^{new}$ as a new verification key, performs necessary encryption on information in terms to the product/service and sends the result to the user terminal. The encryption here is preferably what is acquired by an exclusive OR using $T_A^{new}$ or $T_A^{old}$. If an encryption done by being calculated an exclusive OR by using $T_A^{new}$ is used here, the user terminal can confirm that the server calculated $T_A^{new}$ correctly. The user terminal acquires information in terms of the product/service at step 556, and performs a necessary decryption process on the information. Then at step 557, the user terminal replaces a verification key with $T_A^{new}$, which is the same as the user terminal stores t−1 as times for applying the hash function to have $T_A^{new}$ for the next verification key. At step 558, the user terminal ends the process. In this processing flow 500, the product/service DB server need not have $S_A$, as it can acquire $T_A^{new}$ from $E_T$ sent from the user terminal (tag reader) if only holding $T_A^{old}$.

Figure 6:
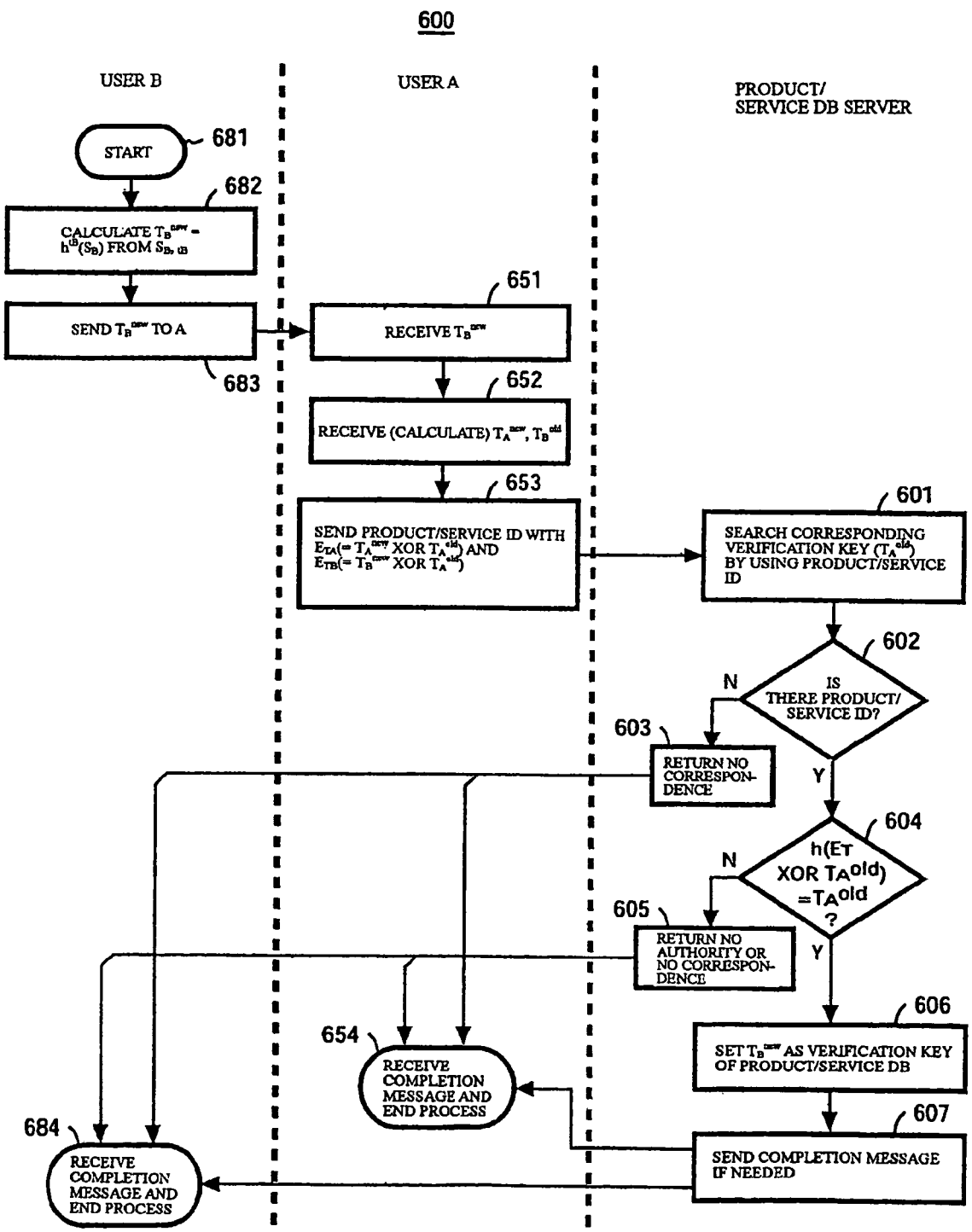
FIG. 6 shows an example of a processing flow of transferring the ownership of the authority in terms of a product/service.

FIG. 6 shows a processing flow of transferring the ownership of the authority in terms of a product/service. It is assumed here that the ownership of the authority is transferred from a user A (assignor) to a user B (assignee). Therefore, before the transferring of the ownership of the authority begins, the user A has the ownership of the authority and the product/service DB contains verifying information (verification key: $T_A^{old}$) of the user A. A user terminal of the user B, which the user A admits to transfer the ownership of the authority in terms of the product/service, starts the processing at step 681. At step 682, the user B acquires $S_B$ by using a random number or the like. The user B calculates $T_B^{new}$ by applying a hash function h by u (integer of 1 or more) times to $S_B$. At step 683, the user B sends $T_B^{new}$ to a user terminal of the user A, which admits to transfer the ownership of the authority to the user B.

At step 651, the user terminal of the user A receives $T_B^{new}$ from the user terminal of the user B. At step 652, the user terminal of the user A calculates $T_A^{new}$ and $T_A^{old}$ by using the hash function h, t and $S_A$. $T_A^{old}$ is acquired by applying the hash function h by t times to $S_A$ and $T_A^{new}$ is acquired by applying the hash function h by t−1 times to $S_A$. At step 653, the user terminal of the user A acquires an exclusive OR $E_{TA}$ of $T_A^{new}$ and $T_A^{old}$, then an exclusive OR $E_{TB}$ of $T_B^{new}$ and $T_A^{old}$ and sends the results with the product/service ID in terms of transferring the ownership of the authority to the product/service DB server. A multi tag reader may send them. At step 601, the product/service DB server searches the product/service DB for a corresponding verification key ($T_A^{old}$) by using the product/service ID as a searching key. At step 602, the product/service DB server determines whether there is a corresponding product/service ID or not. If it is determined that there is no corresponding product/service ID (No), the product/service DB server proceeds to step 603 and sends a message that there is no product/service ID. The user terminal of the user A and the user terminal of the user B receive the message and end the process at step 654 and step 684, respectively. If it is determined that there is a corresponding product/service ID (Yes) at step 602, the product/service DB server proceeds to step 604.

At step 604, the product/service DB server acquires $T_A^{new}$ from the exclusive OR of the searched verification key ($T_A^{old}$) and $E_{TA}$, and determines whether the value that it is applied with the hash function once matches the searched verification key ($T_A^{old}$) or not. If it is determined that they do not match (No), the product/service DB server proceeds to step 605 and sends a message that the user A has no ownership of the authority, or a message of no correspondence to the user terminal of the user A and the user terminal of the user B. The user terminal of the user A and the user terminal of the user B receive the message and end the processes at step 654 and step 684, respectively. If it is determined that they match (Yes) at step 604, i.e., if it is determined that the user is certified, the product/service DB server proceeds to step 606, acquires $T_B^{new}$ from an exclusive OR of $T_A^{old}$ and $E_{TB}$ and sets $T_B^{new}$ as a new verification key. At step 607, the product/service DB server sends that the certification completed to the user terminal of the user A and the user terminal of the user B. The user terminal of the user A and the user terminal of the user B receive the message and end the processes at step 654 and step 684, respectively.

With the processing flow 600, the ownership of the authority can be transferred from the user A to the user B with the security being kept. Only the user A, who is an authorized owner with the authority, is allowed to transfer the ownership of the authority to another user. If the same owner with the authority is recorded as that is stored in the product/service DB server at the first step of recording a record of information on the product/service in the product/service DB, i.e., if a product or the like is actually transferred to a customer (user B) by making a user A as the product/service DB server, the product/service can easily transferred to a distribution process with this processing flow 600. Transferring of data between product/service DB servers of different companies can also be performed by using this processing flow 600. For example, the ownership of the authority can be transferred with the security being kept, by making a manufacturer as the user A and a distributor as the user B.

One-time verifying information uses a verification key which is what a random number S is applied with a hash function by t times first, and uses a verification key which is what the random number S is applied with the hash function by t−1 times for the next time. It uses a verification key which is what the random number S is applied with the hash function by t−2 times for the further next time. As the verification is performed for many times, the times for applying the hash function will be 0. In such a case, the random number S and t can be reset by using the processing flow 600. For this purpose, it only needs to perform processes for the user A and the user B in the same user terminal. With this procedure, new verification is enabled by using a verification key, which is what a new random number is applied with the hash function by times of integer.

Figure 7:
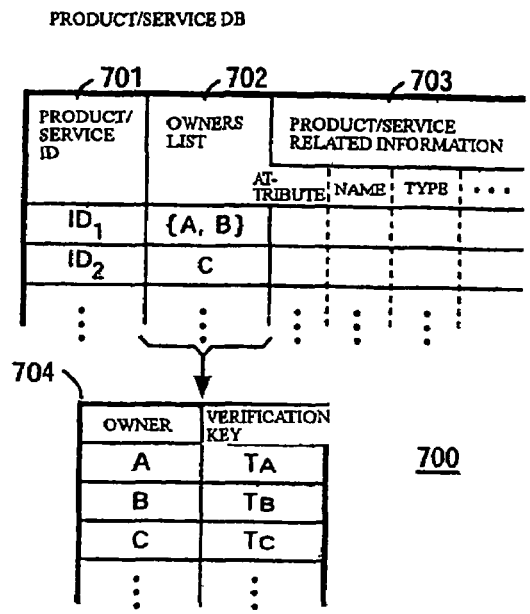
FIG. 7 shows an outline of a product/service DB used in an application.

An application which modifies the embodiment will be described. FIG. 7 is an outline 700 of a product/service DB used in an application. This is a partly modified product/service DB 306 shown in FIG. 3. If a plurality of users have to view a history of a product/service to access the product/service, an embodiment can be such that the product/service DB contains an entry for an owners list with a verification key is assigned for each owner. The reference numeral 701 denotes a product/service ID. The reference numeral 702 denotes an owners list, which can contain a plurality of owners. The reference numeral 703 denotes information on the product/service. The reference numeral 704 denotes a table for managing verification keys for respective owners. With the configuration of the product/service DB 700, each of the sharing owners can access information on the product/service by keeping security without letting the other sharing owner to know the owner's own verification key for one product/service.

Figure 8:
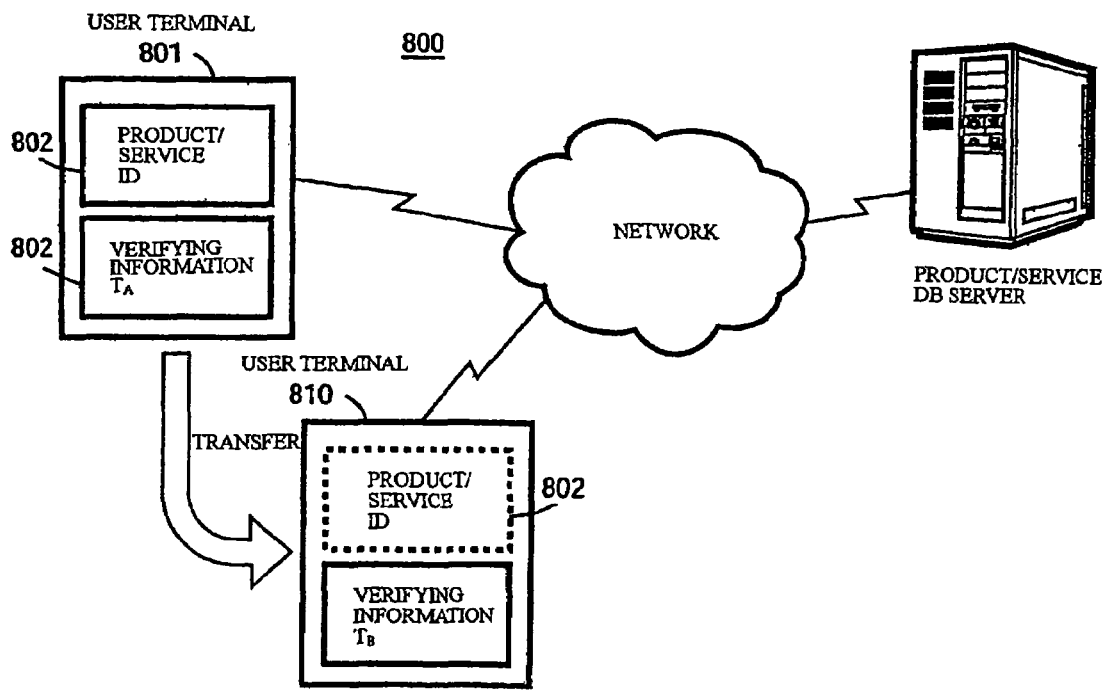
FIG. 8 shows an example where a user terminal keeps both a product/service ID and a verification key.

FIG. 8 shows an application where a user terminal keeps both a product/service ID and a verification key. Here, the user terminal has both of the product/service ID 106 and the verifying information 108 shown in FIG. 1. The user terminal 801 saves a product/service ID 802 and verifying information 803. This embodiment is particularly convenient in the case where a product/service is a digital ticket or the like. If the product/service ID is a digital ticket or the like, the user terminal can save the product/service ID. An embodiment of a cellular phone having a function of a digital ticket is increasingly used. With this application, a user can directly buy a digital ticket from a ticket counter or an Internet site and a ticket can be distributed among users with security being kept high. A user can easily buy this type of digital ticket by using the flow 600 shown in FIG. 6. The product/service DB server only needs to include information on the digital ticket in the message it sends to the user terminal of the user B at step 607.

If the ownership of the authority is temporally transferred from a user A to a user B in such a case that the user A leaves management of products or the like to the user B while the user A is on a business trip, another application can be considered to transfer the ownership of the authority by using the processing flow 600 and $T_B^{old}$ is used as a verification key with a time limit and the verification key returns to $T_A^{new}$ after a predetermined period. The verification key returns to $T_A^{new}$ and not to $T_A^{old}$ here because $T_A^{old}$ was used in transferring the ownership of the authority from the user A to the user B and cannot be used as the one-time verification key any more.

A manufacturer without a product/service DB server has to register itself with a product/service DB managed by a third party. In such a case, a product/service ID, a verification key or an attribute of a product/service can be sent from a user terminal for registration. The embodiments of the present invention have been described, though, the present invention is not technically limited to the ranges described in the above-mentioned embodiments. It is apparent to those skilled in the art that various modifications and improvements can be applied to the embodiments. It is apparent from the claims that the embodiments with various modifications and improvements can be included in the technical range of the present invention. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. An apparatus for verifying authority of at least one owner comprising:
a computer processor configured to:
receive an identifier of a product, and a first verification key, wherein said apparatus verifies said authority of said at least one owner in terms of said identifier, said first verification key which is held at a terminal of said at least one owner with said authority involving said product, and a second verification key concerning said identifier of said product wherein said identifier of said product and said second verification key are stored in a product database;
acquire said second verification key from said product database; and
perform a determination of whether or not there is said authority of said at least one owner from said first verification key and said second verification key,
wherein said determination is performed by using a hash value acquired by applying a one-way hash function to a number acquired by a predetermined method by t (an integer of 1 or more) times as said first verification key, and by using a hash value acquired by applying said one-way hash function to said number acquired by said predetermined method by t−1 times as a verification key in a subsequent verification of said authority of said at least one owner, and
wherein said computer processor is configured to encrypt a result of said performed determination of whether or not there is said authority of said at least one owner by using said hash value acquired by applying said one-way hash function to said number acquired by said predetermined method by t−1 times as an encryption key.

2. The apparatus for verifying authority according to claim 1, wherein said terminal of said at least one owner with said authority saves said identifier of said product.

3. The apparatus for verifying authority according to claim 1, wherein said terminal of said at least one owner with said authority is configured to read said identifier of said product.

4. The apparatus for verifying authority according to claim 1, further configured to save a list showing that said product has a plurality of owners and a different instance of said second verification key for each of said owners of said authority.

5. The apparatus for verifying authority according to claim 1, wherein said product is a service ticket for a user to receive a service.

6. An apparatus for verifying authority in terms of an identifier of a product, a first verification key for verifying said authority held at a terminal of an assignor of said authority involving said product, and a second verification key of said assignor concerning said identifier of said product stored in a product database, configured to:
receive a third verification key of an assignee and said first verification key of said assignee with said authority held at said terminal;
acquire said second verification key of said assignor from said product database;
verify said first verification key in terms of said second verification key; and
store said third verification key of said assignee in place of said second verification key in said product database under the condition that said verification is successful,
wherein said apparatus is configured to use a hash value acquired by applying a one-way hash function to a number acquired by a predetermined method in said terminal of said assignor by t (an integer of 1 or more) times as said first verification key and use a hash value acquired by applying said one-way hash function to a number acquired by a predetermined method in a terminal of said assignee by u (an integer of 1 or more) times as said third verification key and as a verification key to be used in a subsequent verification of the authority of said assignee, wherein said apparatus is configured to encrypt a result of said subsequent verification of said authority of said assignee by using a hash value acquired by applying said one-way hash function to said number acquired by said predetermined method in said terminal of said assignee by u−1 times as an encryption key.

7. A terminal involving a product, wherein said terminal is configured to store a first verification key managed separately from an identifier of said product, said terminal further configured to:

create said first verification key configured to verify the authority of at least one owner in terms of a second verification key involving said product stored in a product database, wherein said terminal uses a hash value acquired by applying a one-way hash function to a number acquired by a predetermined method by t (an integer of 1 or more) times as said first verification key, and uses a hash value acquired by applying said one-way hash function to said number acquired by said predetermined method by t−1 times as a verification key in a subsequent verification of said authority of said at least one owner, wherein said terminal is configured to encrypt said first verification key by acquiring an exclusive OR of said first verification key and said hash value acquired by applying said one-way hash function to said number acquired by said predetermined method by t−1 times as an encryption key.

8. The terminal according to claim 7, wherein said terminal is configured to read said identifier of said product.

9. The terminal according to claim 7, wherein said product is a service ticket for a user to receive a service.

10. A method for verifying the authority of at least one owner in terms of an identifier of a product, a first verification key for verifying said authority held at a terminal of an owner with said authority involving said product, and a second verification key for verifying said authority concerning said identifier of said product stored in a product database, comprising:

receiving said identifier and said first verification key;

acquiring said second verification key from said product database; and determining whether or not said authority of said at least one owner exists according to said first verification key and said second verification key, wherein said determining includes using a hash value acquired by applying a one-way hash function to a number acquired by a predetermined method by t (an integer of 1 or more) times as said first verification key for verifying said authority of said at least one owner, and using a hash value acquired by applying said one-way hash function to said number acquired by said predetermined method by t−1 times as a next verification key in a subsequent verification of said authority of said at least one owner, and encrypting, by said terminal, said first verification key by acquiring an exclusive OR of said first verification key and said hash value acquired by applying said one-way hash function to said number acquired by said predetermined method by t−1 times as an encryption key.

11. The method for verifying the authority according to claim 10, wherein said terminal of said owner with said authority saves said identifier of said product.

12. The method for verifying the authority according to claim 10, wherein said terminal of said owner with said authority reads said identifier of said product.

13. The method for verifying the authority according to claim 10, including saving a list showing that said product has a plurality of owners and a separate instance of said second verification key for each of said owners of said authority.

14. The method for verifying the authority according to claim 10, wherein said product is a service ticket for a user to receive a service.

15. A method for verifying the authority of at least one owner in terms of an identifier of a product, a first verification key for verifying said authority held at a terminal of an assignor with said authority involving said product, and a second verification key of said assignor concerning said identifier of said product stored in a product database comprising:

receiving a third verification key of an assignee and said first verification key of said assignee with said authority held at said terminal of said assignor;

acquiring said second verification key of the assignor from said product database;

verifying said first verification key in terms of said second verification key; and storing said third verification key of said assignee as said second verification key in said product database under the condition that said verification is successful, wherein said verification includes using a hash value acquired by applying a one-way hash function to a number acquired by a predetermined method in said terminal of said assignor by t (an integer of 1 or more) times as said first verification key for verifying said authority of said assignor, and using a hash value acquired by applying said one-way hash function to a number acquired by a predetermined method in a terminal of said assignee by u (an integer of 1 or more) times to as said third verification key and as a verification key in a subsequent verification of the authority of said assignee, and encrypting, by said terminal of said assignor, said first verification key by acquiring an exclusive OR of said first verification key and a hash value acquired by applying said one-way hash function to said number acquired by said predetermined method in said terminal of said assignor by t−1 times as an encryption key.

16. A computer program product stored on a non-transitory computer storage medium with computer readable program code embodied thereon for managing information regarding the authority of at least one owner involving a product at a terminal, wherein the computer program code when executed causes said terminal:

store a first verification key managed separately from an identifier of said product;

create said first verification key which is used for verification in an apparatus for verifying said authority of said at least one owner in terms of a second verification key involving said product stored in a product database, wherein said terminal uses a hash value acquired by applying a one-way hash function to a number acquired by a predetermined method by t (an integer of 1 or more) times as said first verification key for verifying said authority of said at least one owner, and uses a hash value acquired by applying said one-way hash function to said number acquired by said predetermined method by t−1 times as a verification key in a subsequent verification of said authority of said at least one owner, and encrypt said first verification key by acquiring an exclusive OR of said first verification key and said hash value acquired by applying said one-way hash function to said number acquired by said predetermined method by t−1 times as an encryption key.

17. The computer program product of claim 16, wherein said terminal is configured to read said identifier of said product.

18. The computer program product of claim 16, wherein said product is a service ticket for a user to receive a service.

* * * * *